United States Patent [19]

Propst

[11] 3,984,621

[45] Oct. 5, 1976

[54] ELECTRICALLY WIRED FLOOR CONSTRUCTION

[75] Inventor: Robert L. Propst, Ann Arbor, Mich.

[73] Assignee: Merritt Foods Company, Kansas City, Mo.

[22] Filed: Sept. 15, 1975

[21] Appl. No.: 613,083

[52] U.S. Cl. ................................. 174/48; 52/220
[51] Int. Cl.² ........................................ H02G 3/26
[58] Field of Search ............ 174/48, 49, 70 R, 70 C, 174/72 C; 52/220, 221; 219/213; 428/167, 169

[56] References Cited
UNITED STATES PATENTS

| | | | |
|---|---|---|---|
| 2,085,215 | 6/1937 | Gonzalez | 52/220 X |
| 2,298,226 | 10/1942 | O'Brien et al. | 174/70 R X |
| 3,549,781 | 12/1970 | Jones | 174/49 |

*Primary Examiner*—Arthur T. Grimley
*Assistant Examiner*—D. A. Tone
*Attorney, Agent, or Firm*—Lowe, Kokjer, Kircher, Wharton & Bowman

[57] ABSTRACT

A wiring system for delivering electrical energy from a remote location to another location such as an office module through a laminated floor construction which includes a floor, a floor covering above the floor and a subcovering positioned between the floor and the floor covering. The subcovering is of predetermined thickness and a groove is formed in the subcovering which extends all the way or substantially through the subcovering and extends between the two locations. An electrical cable unit comprising a plurality of conductors and an insulator sheath surrounding the conductors is disposed in the groove and is of a thickness such that the outer surface of the cable is flush with the top surface of the subcovering so that a smooth top surface is provided on which the floor covering is placed.

5 Claims, 4 Drawing Figures

U.S. Patent  Oct. 5, 1976  3,984,621
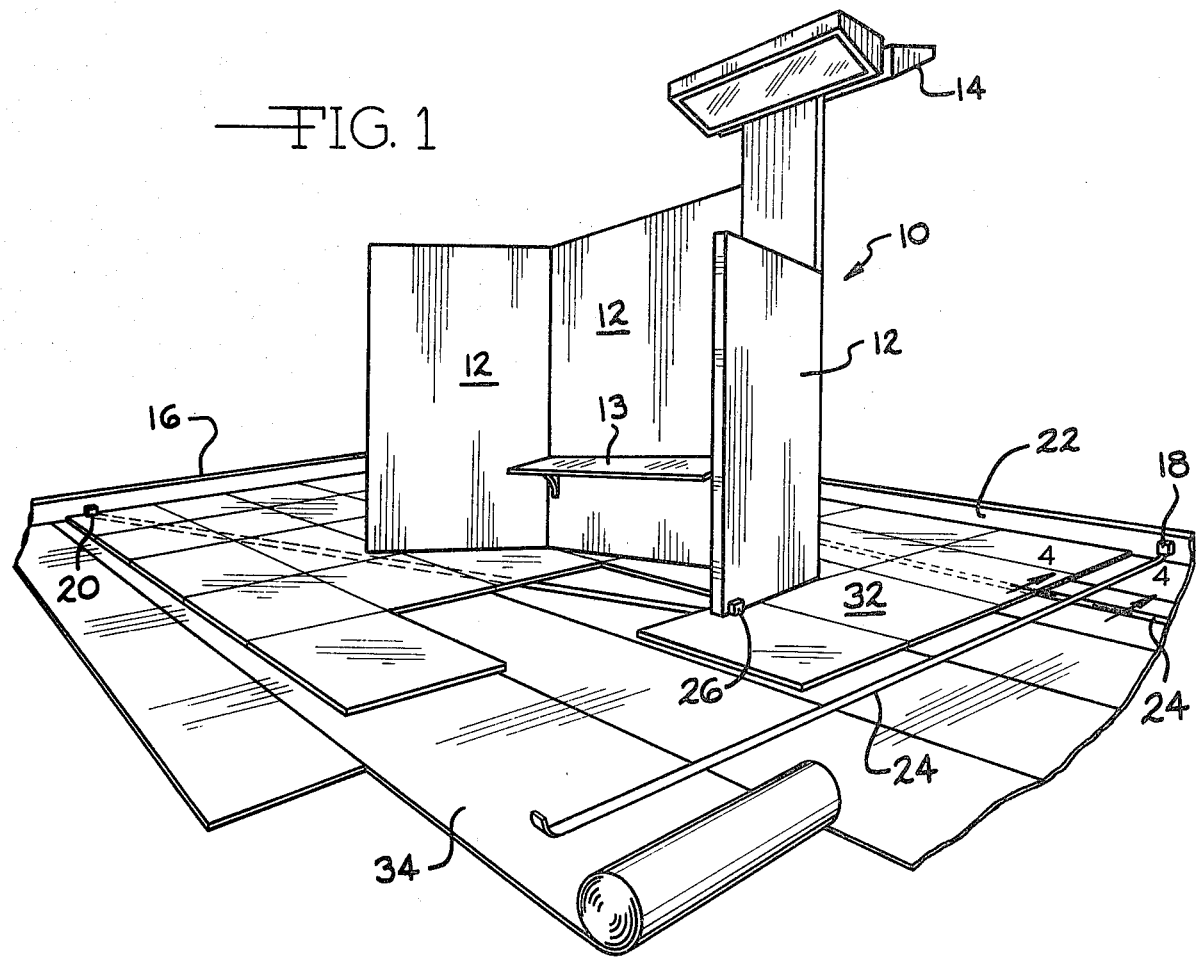
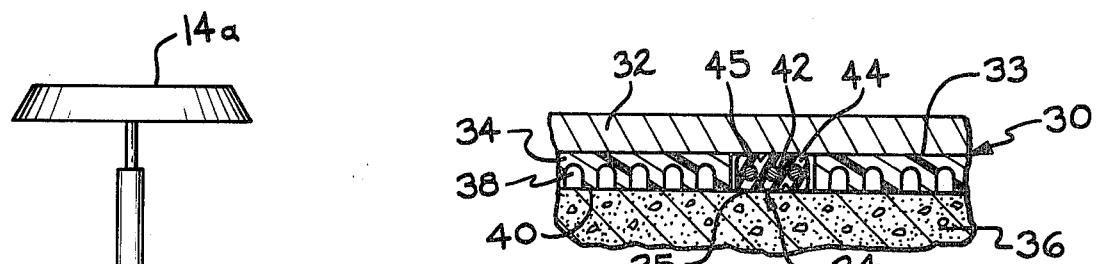
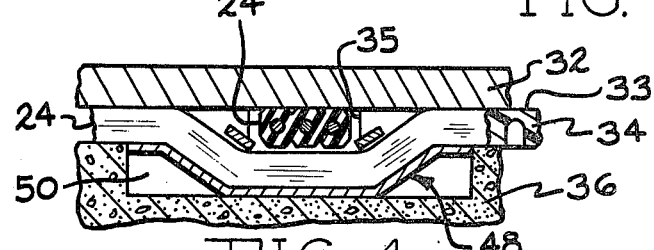
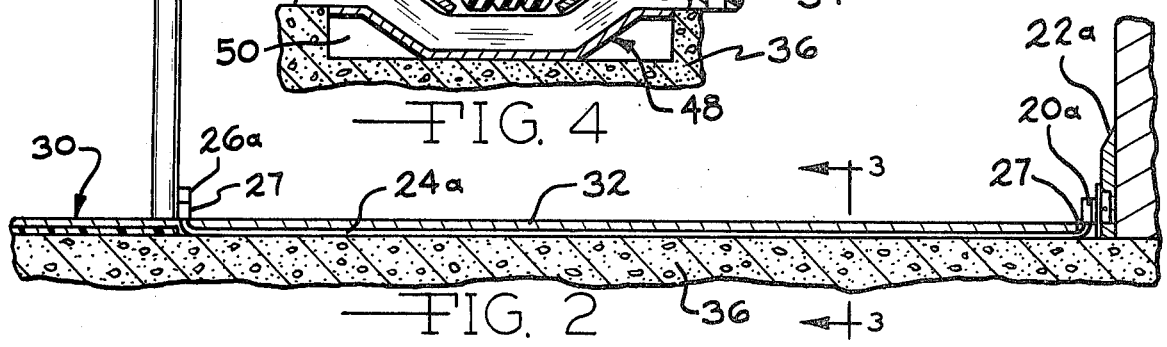

ELECTRICALLY WIRED FLOOR CONSTRUCTION

BACKGROUND OF THE INVENTION

Many modern office areas are formed by assembling a large number of free standing desks or interconnected panels which function to both define individual working zones and also to support work surfaces. A growing problem associated with office areas of this type is the problem of delivering electrical energy to the individual office modules so that the energy delivery systems are inconspicuous, fast to install, and relatively inexpensive. It is the object of the present invention, therefore, to provide an electrically wired floor construction which provides for delivery of electrical energy to remote locations, such as office modules, from an energy source.

SUMMARY OF THE INVENTION

The present invention provides a wiring system for delivering electrical energy to locations remote from the source of electrical energy by means of electrical cables disposed in a laminated floor construction which consists of a floor, a floor covering and a subcovering capable of having a groove formed at any desired location therein so that the groove will extend between the two points desired to be electrically connected.

An electrical cable is provided which is of a generally flat construction comprising a plurality of conductors surrounded by a dielectric sheath which insulates the conductors. The cable is disposed in the groove and is of a thickness such that the outer surface of the cable is flush with the top surface of the subcovering to provide a smooth top surface on which the floor covering is placed.

This construction enables the delivering of electrical energy to substantially any point from a remote location. The under-the-carpet cable is inconspicuous and inexpensive. It also provides a very versatile energy delivery system that is adaptable to various requirements.

Further objects, features and advantages of this invention will become apparent from a consideration of the following description, the appended claims and the accompanying drawing in which:

FIG. 1 is a perspective view of a modular office arrangement showing the installation therein of the wiring system of the present invention;

FIG. 2 is a sectional view of an office arrangement showing an electrical cable disposed in a laminated floor construction and which electrically connects a side wall electrical outlet with an office partition;

FIG. 3 is an enlarged sectional view of the laminated floor construction taken substantially at line 3—3 in FIG. 2; and FIG. 4 is an enlarged sectional view, as seen from substantially the line 4—4 of FIG. 1, illustrating a crossover in the wiring system of this invention.

Referring to the drawing, the wiring system of the present invention is shown in FIG. 1 associated with a modern office area made of a number of office modules, only one of which is shown and indicated generally at 10. The module 10 is defined by a plurality of panels 12 which are interconnected in a well known manner so as to define an area where personnel can perform their jobs and provide supports for work surfaces 13. One of the panels 12 in the FIG. 1 illustration supports a light fixture 14 which provides light in the work areas on both sides of the panels 12, which are located in the interior portion of a room 16. The usual electrical outlets 18 and 20 are located on the baseboard 22 in the room 16 and provide the source of electricity for the room 16. In the energy delivering system of this invention, electrical cables 24 are used to transmit electrical energy from the outlets 18 and 20 to the modules 10.

A sectional view of a typical office arrangement similar to the arrangement shown in FIG. 1 is shown in FIG. 2 and consists of a panel 12a on which the light fixture 14a is mounted. A cable 24a, disposed in a laminated floor construction 30 electrically connects a connector 26a on the panel 12a with the electrical outlet 20a positioned on the baseboard 22a.

The laminated floor construction 30 (FIG. 3) consists of a floor covering 32 such as carpeting, a subcovering 34 and the floor 36. The floor 36 can be of any suitable construction such as wood or concrete and the floor covering 32, in the illustrated embodiment, is a conventional carpet, although other floor coverings such as floor tile can be easily substituted therefor. The subcovering 34 which is placed on the floor 36 and which supports the carpet 32 is constructed of a firm but slightly resilient material such as hard rubber having a plurality of slots 38 and ridges 40 which support a solid continuous top surface.

A groove 35 is formed in the subcovering 34 so that it extends all the way through the subcovering 34 to the floor 36. A groove that extends all the way through the subcovering 34 to the floor 36 is readily formed with a double edged cutting tool in which the edges are spaced apart a distance corresponding to the desired width of the groove 35. The cable 24 is disposed in the groove 35. It can readily be seen that any number of grooves 35 can be formed in the subcovering 34 enabling an equal number of cables 24 to be used to connect a plurality of electrical devices.

The cable 24 is of a generally flat construction having a plurality of conductors 42 which transmit the electrical energy. A dielectric sheath 44 surrounds the cables 42 and provides insulating protection for the conductors 42. The outer surface 45 of the sheath 44 defines the outer surface of the cable 24 and as seen in FIG. 3 the thickness of the cable 24 corresponds to the depth of the groove 35, which is in turn equal to the thickness of the subcovering 34, so that the top side of the cable 24 is flush with the top surface 33 of the subcovering 34 to form a continuous surface on which the floor covering 32 is placed. Thus, the electrical wiring in the floor construction 30 is inconspicuous to the user of the module 10.

The groove 35 extends between the outlet 20 and the connector 26 (FIG. 1) and between the outlet 20a and the connector 26a in FIG. 2. The floor covering 34 is provided with openings 27 located in close proximity to the outlet 20a and the connector 26a to enable the cable 24 to extend through the floor covering 32.

Since the cables 24 are removably disposed in the grooves 35, office modules 10 can be readily rearranged, and new grooves 35 can be formed in the subcovering 34 in which the cables 24 are disposed. Unused grooves 35 can be filled with filler strip or other suitable filling material to maintain the uninterrupted character of the carpet 32.

To install the wiring system of the present invention, the subcovering 34, which is supplied in rolls as shown in FIG. 1, is first used to cover the floor 36. The desired locations of the electrical outlets 26 for the module 10 are determined and the grooves 35 are formed in the subcovering 34, connecting these locations and the wall outlets 18 and 20. The necessary cables 24 are disposed in the grooves 35 and the floor covering 32 is then placed over the subfloor covering 34. The openings 27 can then be formed in the floor covering 32 in close proximity to the positions where the cables 24 will emerge through the covering 32. The selection of a cable 24 and subcovering 34, which are of the same thickness, facilitates the forming of the grooves 35, since the grooves can then be readily formed in the subcovering 34 with a double bladed knife. The cable 24 is then laid in the grooves 35 with assurance that the cable will be flush with the surface 33. When the floor covering 32 is applied, the location of the cable 24 is undetectable to the user of the floor covering. Further, since no expensive built-in metal conduit work, or the like, is required, the total system is relatively inexpensive.

It can thus be seen that this invention provides an electrically wired laminated floor construction which delivers electrical energy to locations remote from the source of the energy. The cables 24 are disposed in grooves 35 formed in a subcovering 34 so that the outer surfaces of the cables 24 are flush with the top surface 33 of the subcovering 34 to provide a smooth surface on which the floor covering 32 can be placed. The cables 24 and the subcovering 34 thus coact to form the center lamination in the composite floor construction 30.

A cross-over saddle 48 (FIG. 4) is employed where two of the cables 24 must cross such as at the location shown in FIG. 1 by the section lines 4—4. A cavity 50 is formed in the floor 36, by use of a routing tool or the like, of a size such that the two-part, snap-together saddle 48 can be positioned therein. The saddle 48 provides a conduit through which one of the conductors 24 can pass under the other conductor 24 so that the top most conductor 24 still has its top surface flush with the top surface 33 of the subcovering 34.

This invention thus provides an efficient, low cost wiring system which avoids major construction work in wiring a floor to deliver electrical energy to interior areas of a large office space or other room enclosure.

What is claimed:

1. A wiring system for delivering electrical energy from one point to a second point spaced horizontally therefrom through a laminated floor construction which includes a floor, a floor covering above the floor and a subcovering between the floor and the floor covering, said subcovering having a top surface and a bottom surface, means forming a groove in said subcovering from the top surface through the bottom surface thereof and extending between said first and second points, and an electric cable unit comprising a plurality of conductors and an insulating sheath surrounding said conductors, the outer surface of said sheath defining the outer surface of said cable unit, said cable unit being disposed in said groove and having a height equal to the depth of the groove and a width at it top surface which is substantially equal to the width of the groove such that the top surface of said sheath is flush with the top surface of said subcovering.

2. The wiring system according to claim 1, wherein an opening is formed in said floor covering in close proximity to at least one of said points through which said cable extends.

3. In a modular office arrangement having free standing walls, an electrically wired floor construction for delivering electricity to one of said walls from a remote location, said floor construction comprising a floor, a floor covering above the floor and a subcovering between the floor and the floor covering, said subcovering having a top surface and a bottom surface, means forming a groove in said subcovering from the top surface through the bottom surface thereof and extending between said remote location and said one wall, and an electrical cable unit comprising a plurality of conductors and an insulating sheath surrounding said conductors, the outer surface of said sheath defining the outer surface of said cable unit, said cable unit being disposed in said groove and having a height equal to the depth of the groove and a width at its top surface which is substantially equal to the width of the groove such that the top surface of said sheath is flush with the top surface of said subcovering.

4. An electrically wired floor construction according to claim 3 wherein said cable unit includes connecting means attached at each end thereof to connect said cable unit at said remote location and to said one wall.

5. An electrically wired floor construction according to claim 3 further including a second cable unit arranged in a crossing relation with said first mentioned cable unit, and means disposed in said floor below said first cable unit providing a passage for said second cable unit.

* * * * *

PO-1050
(5/69)

UNITED STATES PATENT OFFICE
CERTIFICATE OF CORRECTION

Patent No. 3,984,621              Dated October 5, 1976

Inventor(s) Robert L. Propst

It is certified that error appears in the above-identified patent and that said Letters Patent are hereby corrected as shown below:

Title page, Column 1, "Assignee:" should read--Herman Miller, Inc., Zeeland, Michigan.

Title page, Column 2, "Attorney, Agent, or Firm--" should read--Olsen and Stephenson.

Signed and Sealed this

Twenty-fifth Day of January 1977

[SEAL]

Attest:

RUTH C. MASON
*Attesting Officer*

C. MARSHALL DANN
*Commissioner of Patents and Trademarks*